United States Patent [19]

Gongora et al.

[11] Patent Number: 5,458,751

[45] Date of Patent: Oct. 17, 1995

[54] RECOVERY OF APROTIC POLAR SOLVENTS FROM THEIR SALINE AQUEOUS SOLUTIONS

[75] Inventors: Henri Gongora, Billere; Jose-Luis Orozco, Lons, both of France

[73] Assignee: Societe National Elf Aquitaine (Production), Courbevoie, France

[21] Appl. No.: 286,256

[22] Filed: Aug. 8, 1994

Related U.S. Application Data

[63] Continuation of Ser. No. 953,349, Sep. 30, 1992, abandoned.

[30] Foreign Application Priority Data

Oct. 2, 1991 [FR] France ................................. 91 12135

[51] Int. Cl.$^6$ ............................ B01D 61/44; B01D 61/54
[52] U.S. Cl. .................................. 204/182.4; 204/182.5
[58] Field of Search ............................. 204/182.4, 182.5, 204/301

[56] References Cited

U.S. PATENT DOCUMENTS 4,802,965  2/1989  Puetter et al. ...................... 204/182.4
5,089,102  2/1992  Voss ...................................... 204/182.3
5,145,569  9/1992  Schneider et al. ................... 204/182.4

FOREIGN PATENT DOCUMENTS 169049    5/1977  Czechoslovakia .
0381134   8/1990  European Pat. Off. .
91/04782  4/1991  WIPO ................................ 204/182.5

OTHER PUBLICATIONS

Chemical Abstracts, vol. 88, 1978, p. 554, No. 88:152028v.

*Primary Examiner*—John Niebling
*Assistant Examiner*—Arun S. Phasge
*Attorney, Agent, or Firm*—Morgan & Finnegan

[57] ABSTRACT

The invention relates to recovery of an aprotic polar solvent from a saline aqueous solution of this solvent, by a process which consists in desalting the said solution by electrodialysis then in distilling the desalted solution.

To avoid precipitation of metal hydroxides during the electrodialysis, the brine is kept at an acidic pH.

4 Claims, No Drawings

RECOVERY OF APROTIC POLAR SOLVENTS FROM THEIR SALINE AQUEOUS SOLUTIONS

This is a continuation of application Ser. No. 07/953,349, filed on Sep. 30, 1992 now abandoned.

FIELD OF THE INVENTION

The present invention relates to the field of aprotic polar solvents with boiling points higher than that of water, such as dimethyl sulphoxide (DMSO), N-methylpyrrolidone (NMP) and dimethylformamide (DMF).

BACKGROUND OF THE INVENTION

These solvents are used industrially in large quantities, in particular as reaction media for synthesis of organic compounds, as solvents for the manufacture and use of polymers, and in extraction of oil products. In most of these applications, the aprotic polar solvent ends up generally in the form of aqueous solutions which are often rich in dissolved inorganic salts (up to 10% by weight).

For reasons of economy and especially in order to protect the environment, it is particularly desirable to treat these aqueous solutions in order to recover the aprotic polar solvent in a sufficiently pure form in order to allow its reuse.

When it is desired to recover and to purify an aprotic polar solvent from its aqueous solutions, distillation is the most commonly used technique. However, this technique is not directly applicable to saline aqueous solutions of aprotic polar solvents with boiling points higher than that of water. In fact, as water, which is more volatile, is being evaporated, salts which are generally of low solubility in the aprotic polar solvent can generate dangerous distillation conditions by crystallising in an untimely manner in the boiler. Thus, when a saline aqueous solution is being dealt with, it is absolutely essential to carry out its desalting beforehand.

The method of desalting usually practised consists in processing the saline aqueous solution beforehand in a thin film evaporator where the aprotic polar solvent and water undergo flash evaporation and are then entrained, free from salts, towards the distillation column. This method has however the following drawbacks:

- risks of decomposing the aprotic polar solvent on contact with the overheated walls of the evaporator,
- inevitable loss of solvent by entraining with the salts at the bottom of the apparatus,
- tricky operation because of the thickness of the layer of salt which must always be kept to a minimum in order not to damage the scraping mechanism (blades, motor),
- high investment cost and energy cost.

Another technique which allows elimination of the salts before distillation is electrodialysis. Compared to the preceding technique, electrodialysis has the following advantages:

- it can be carried out at room temperature or at a slightly higher temperature (up to 60° C.) and therefore does not risk spoiling the products,
- it allows recovery of more than 98% of the aprotic polar solvent introduced and complete separation of the salts, by providing, on the one hand an aqueous effluent with a high salt content and free from solvent and, on the other hand, an aqueous solution which is enriched in aprotic polar solvent and which can be processed by distillation or any other suitable separation technique,
- it is economical in terms both of investment and of operating costs,
- it can be used in continuous or batch mode,
- finally, it is safe to use.

Application of electrodialysis to water-DMSO-NaNO$_3$ mixtures has already been described in the Czechoslovakian Patent 169,049. In this case electrodialysis proceeds with no particular problem. This is no longer the case however when alkaline aqueous solutions are being dealt with which contain multivalent cations, such as $Zn^{2+}$, made soluble in the form of complexes and capable of precipitating in an alkaline medium in the form of insoluble hydroxides. In this case basifying of the "brine" compartments of the ectrodialyzer and precipitation of zinc in this medium are seen. This precipitate blocks the small intermembrane space and then hinders the flow of the brine which is necessary for the electrodialyzer to function.

It has now been found that this problem can be solved if, during electrodialysis, the brine is kept at an acidic pH. Against all expectation, it has been noted that acidifying the brine in order to avoid precipitation of hydroxides of metals such as zinc is not accompanied by acidifying of the alkaline solution to be desalted and does not have a detrimental effect on the resistivity of the system or on the stability of DMSO (no decomposition into bad-smelling dimethyl sulphide).

DETAILED DESCRIPTION OF THE INVENTION

The subject of the present invention is therefore a process for recovery of an aprotic polar solvent from an alkaline saline aqueous solution of this solvent, consisting in desalting the said solution by electrodialysis and then in distilling the desalted solution, this process being characterised in that, during the electrodialysis stage, the pH of the brine is kept at a value between 1 and 7.

The process according to the invention is more particularly applicable to processing of solutions which comprise by weight from 0.5 to 80% of aprotic polar solvent, from 20 to 99.5% of water and up to 10% of dissolved inorganic salts, in particular zinc salts such as, for example, zinc acetate. The alkaline nature of these solutions (pH 7 to 12) is in general due to the presence of a base which can form soluble complexes with the metal cations (for example, ammonia with Zn). In addition to these constituents, the solutions to be desalted can also contain nonmetallic salts and/or ionic or nonionic organic compounds.

The brine used for electrodialysis in general consists of water or water containing salt; the salts can come from the solution which is to be processed. Keeping the brine at an acidic pH in accordance with the process according to the invention can be done by regularly adding thereto, continuously or periodically, an inorganic acid.

Hydrochloric acid is preferably used as the acid, but use of a different inorganic acid, for example $HNO_3$, $H_2SO_4$, or $H_3PO_4$, does not go beyond the scope of the present invention. The concentration of acid used is not important, but it is more convenient to use a fairly concentrated acid (for example 33% HCl).

The quantity of acid to be added to the brine depends on many factors, and in particular on the pH ensuring high solubility of the metal salts. Since too low a pH can harm the energy efficiency, it is preferable to use the highest acidic pH possible which avoids malfunction (blocking of the membrane separators or increase of the resistivity of the membranes).

The acid can be introduced into the brine circuit at one or more points, for example in the vessel or in the brine recirculation circuit.

Regulating the pH of the brine between 1 and 7 allows in general the precipitation of hydroxides of metals such as zinc to be avoided. However, for each metal cation, there is an optimum pH range which can be determined by prior tests and whose value depends on the solubility product of the metal hydroxide and on the pressure drop which is acceptable in the cells. In the case of zinc, a pH between approximately 4.5 and 6.5 is preferably used.

The rest of the electrodialysis itself is carried out in a manner which is known per se, according to conventional procedures and in conventional equipment.

Similarly, the final stage of distilling the desalted solution, which consists mainly of water and the aprotic polar solvent to be recovered can be carried out in a wholly conventional manner.

EXAMPLES

The following examples illustrate the invention without limiting it.

EXAMPLE 1 a) In order to desalt a solution (pH= 10.3; conductivity= 15.9 mS/cm) made up of 600 g water, 300 g DMSO, 39.5 g zinc acetate dihydrate, 125 g 28% strength aqueous ammonia and 5 g ammonium sulphate, a P1 type SRTI electrodialyzer, equipped with ASAHI GLASS AMV/CMV membranes and comprising 20 cells each of 69 cm² working area, was used, and the voltage applied to the terminals of the electrodialyzer was 30 volts (that is to say 1.5 volts per cell).

The electrodialyzer comprises three vessels:

a product vessel in which the solution to be desalted is put, a vessel for the brine which will be enriched in salts and which at the start consists of a solution of 5 g NaCl in 1000 g water, acidified to pH=4.9 by means of HCl (conductivity=8.83 mS/cm), an electrolyte vessel containing a solution of 12 g NaCl in 1200 g water for rinsing the graphite electrodes.

Throughout the desalting (42 minutes), the pH of the brine was kept at 5 by adding HCl. The electrodialysis proceeded without appearance of a zinc hydroxide precipitate being observed and a desalted solution was obtained (pH=11.2; conductivity=0.29 mS/cm) whose zinc content was reduced by a factor of 100. Virtually all the salts were transferred into the end brine (pH=5.0; conductivity=81.3 mS/cm).

b) When repeating the same operation without adding HCl, the pH of the brine increases rapidly and, after 5 minutes of electrodialysis, the appearance of cloudiness in the brine compartments is noted, which necessitates stopping the operation on grounds of safety (low flow rate and high pressure).

EXAMPLE 2

Procedure is as in Example 1-a except that DMSO is replaced by the same quantity of DMF. The results are collected in the following table. No precipitate appears in any of the compartments throughout the operation.

| TIME (min) | PRODUCT | | | BRINE | | ELECTROLYTE | |
|---|---|---|---|---|---|---|---|
| | Zn % | pH | Cond.* (mS cm$^{-1}$) | pH | Cond.* (mS cm$^{-1}$) | pH | Cond.* (mS cm$^{-1}$) |
| 0 | 1.1 | 11.0 | 12.51 | 6 | 8.46 | 7.2 | 12.6 |
| 41 | 0.0102 | 11.4 | 0.88 | 4.86 | 88.7 | 7.9 | 12.1 |

(* = Conductivity)

EXAMPLE 3

Procedure is as in Example 1-a, but the DMSO is replaced by the same quantity of NMP. No precipitate appears in any of the compartments throughout the experiment whose results are collected in the following table.

| TIME (min) | PRODUCT | | | BRINE | | ELECTROLYTE | |
|---|---|---|---|---|---|---|---|
| | Zn % | pH | Cond.* (mS cm$^{-1}$) | pH | Cond.* (mS cm$^{-1}$) | pH | Cond.* (mS cm$^{-1}$) |
| 0 | 1.1 | 11.0 | 12.56 | 6 | 10.97 | 7.4 | 14.54 |
| 37 | 0.0196 | 11.3 | 0.441 | 4.9 | 86.3 | 7.7 | 12.18 |

(* = Conductivity)

EXAMPLE 4

In order to desalt an aqueous solution (pH=11;conductivity=15.9 mScm$^{-1}$) containing 30% by weight of DMSO, 1.62% of zinc, 32 g/l of $NH_3$ and 35.4 g/l of $CH_3COOH$, an AQUALYZER CORNING P 170 electrodialyzer fitted with ASAHI GLASS AMV/CMV membranes and comprising 300 cells of 6.9 m² working area, was used, and the voltage applied to the terminals of the electrodialyzer was 110–130 volts.

The brine vessel initially containing an aqueous solution of 5 g/l NaCl (pH adjusted to 4.5 by means of HCl) is fed with water in order to keep a constant resistivity and with HCl in order to keep the pH between 4 and 6. By overflowing, the brine vessel feeds the electrolyte circuit used to irrigate the electrodes.

Under the operating conditions indicated below, a desalting ratio with respect to zinc of 1/100 is obtained with no problem of blocking in the cells.

Operating parameters

Vessel for product to be desalted
 initial resistivity: 58 ohm cm
 desired limit of resistivity: 500 ohm cm
 dialysis output pH: approximately 11
 processing unit weight: 18 kg/cycle Brine vessel
 temperature: approximately 42° C.
 target resistivity: approximately 25 ohm cm
 pH between 4 and 6 (by adding 33% HCl)
 desalting water feed rate: 50–70 kg/h
 constant volume of bath (electrolyte + brine): approximately 120 l
 recirculation rate in the cells: approximately 1.5 m$^3$/h
 permissible relative pressure: approximately 1.7 bar
 flow rate of brine continuously extracted: 50–70 kg/h Electrical data (in steady state)
 current: approximately 5 A
 electrode voltage: 100 to 125 volts Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Process for the substantially complete recovery of an aprotic polar solvent from an alkaline saline aqueous solution of the aprotic polar solvent containing multivalent metal cations, comprising the steps of:

desalting the alkaline saline aqueous solution having an alkaline pH by electrodialysis using a brine having a pH;

regulating the pH of the brine between 1 and 7 so as to minimize hydroxide formation while simultaneously maintaining the alkaline pH of said alkaline saline aqueous solution;

distilling the desalted solution;

recovering the aprotic polar solvent, said aprotic polar solvent being one of dimethyl sulphoxide, N-methylpyrrolidone or dimethylformamide.

2. Process according to claim 1, wherein the alkaline saline aqueous solution to be desalted comprises by weight 0.5 to 80% of aprotic polar solvent, 20 to 99.5% of water and up to 10% of dissolved inorganic salts.

3. Process according to claim 1, wherein said regulating step regulates the pH of the brine between 1 and 7 by adding hydrochloric acid.

4. Process according to claim 1, wherein said regulating step regulates the pH of the brine between approximately 4.5 and 6.5.

* * * * *